(12) United States Patent
Valiulis et al.

(10) Patent No.: US 11,654,948 B2
(45) Date of Patent: May 23, 2023

(54) CAR SEAT HOLDER

(71) Applicants: Stanley Carl Valiulis, Rockford, IL (US); Lindsey Fleischhauer, Naperville, IL (US)

(72) Inventors: Stanley Carl Valiulis, Rockford, IL (US); Lindsey Fleischhauer, Naperville, IL (US)

( * ) Notice: Subject to any disclaimer, the term of this patent is extended or adjusted under 35 U.S.C. 154(b) by 47 days.

(21) Appl. No.: 17/397,768

(22) Filed: Aug. 9, 2021

(65) Prior Publication Data
US 2023/0040649 A1 Feb. 9, 2023

(51) Int. Cl.
*B62B 5/08* (2006.01)

(52) U.S. Cl.
CPC .................... *B62B 5/082* (2013.01)

(58) Field of Classification Search
CPC ....... B62B 3/144; B62B 3/1444; B62B 5/082; B60N 2/2842
See application file for complete search history.

(56) References Cited

U.S. PATENT DOCUMENTS

| | | | | |
|---|---|---|---|---|
| 1,389,073 A | * | 8/1921 | Schlosser | B60N 3/008 5/118 |
| 1,732,520 A | * | 10/1929 | Ociea | A47B 31/06 5/118 |
| 3,574,872 A | * | 4/1971 | Mattila | A47D 13/02 5/118 |
| 3,784,990 A | * | 1/1974 | Elisofon | A47D 7/04 5/118 |
| 7,475,885 B2 | | 1/2009 | Kovath | |
| 8,424,138 B1 | * | 4/2013 | Pinnell | B62B 3/1444 5/118 |
| 10,723,376 B2 | * | 7/2020 | Valiulis | B62B 5/082 |
| D904,815 S | * | 12/2020 | Valiulis | D6/716 |
| 11,001,288 B2 | * | 5/2021 | Valiulis | B62B 3/144 |
| 2009/0070930 A1 | | 3/2009 | Roman | |
| 2017/0190348 A1 | * | 7/2017 | Thompson | B62B 3/1444 |
| 2017/0217340 A1 | * | 8/2017 | Estraykh | A47D 1/10 |
| 2019/0100228 A1 | * | 4/2019 | Valiulis | B62B 3/14 |
| 2020/0079409 A1 | * | 3/2020 | Valiulis | B62B 3/144 |

FOREIGN PATENT DOCUMENTS

EP 2298620 A2 3/2011

OTHER PUBLICATIONS

Binxy Baby Shopping Cart Hammock (Black), https://www.amazon.com/Shopping-Hammock-Original-Ergonomic-Positioner/dp/B01BZ2WNS8?th=1.

* cited by examiner

*Primary Examiner* — Jeffrey J Restifo (57) ABSTRACT

A car seat holder is used to support a portable infant car seat by providing a flexible support. The apparatus comprises a first support, a second support, and a canvas. The first support and the second support are elongated members that extend across a shopping cart. The first support and the second support are rigid members that distribute the weight of an infant carriage device. The canvas is a flexible surface that extends from the first support to the second support across the shopping cart. The canvas provides a mechanism for transmitting the weight of the infant carriage device to the first support and the second support. In this way, the first support and second support hold the canvas in optimal position for holding an infant car seat. This arrangement frees up space within a shopping cart.

19 Claims, 6 Drawing Sheets

CAR SEAT HOLDER

FIELD OF THE INVENTION

The present invention generally relates to car seats. More specifically, the car seat holder relates to an apparatus that spans across the width of a shopping cart, providing an elevated surface upon which a user may safely and conveniently place an infant within a standard removable car seat.

BACKGROUND OF THE INVENTION

A new parent must be ready to fully devote their time to caring for their infant. There can be no lapses of attention or windows of negligence, as murphy's law would suggest that the infant would certainly meet trouble. To this end, a wide variety of devices allow for monitoring of children and infants as they develop. From monitors to strollers to car seats, every precaution has been taken to ensure that an infant never has to be far from a caretaker's gaze. Further, many of these devices are well-equipped to provide a large amount of comfort to the infant.

Unfortunately, many of these devices are ill-equipped to address the issue of simultaneously caring for an infant and shopping for groceries. These activities combined provide a unique problem, specifically that carrying a baby in a car seat or stroller requires at least one hand and pushing a shopping cart requires two hands. To this end, the most common solution is for a parent or guardian to place a carriage or baby within a car seat into the shopping cart. On one hand, this does allow the parent to push the shopping cart while watching the infant or child. However, one common solution is for the parent or guardian to carry the infant in the car seat; in this case, the car seat the child is in takes up extra space within the shopping cart, making it difficult to add shopping items without smothering the infant or running out of space. What is needed is a hanging area capable of suspending the infant and the infant's mode of transportation over the shopping cart, thus freeing the space within the cart.

The present invention addresses this issue. The present invention is a car seat holder that allows the user to suspend a car seat, with a contained infant, above the base of a shopping cart. The present invention has two rods of adjustable length that span the width of the shopping cart. The rods support a hanging hammock that is capable of supporting the weight of an infant and an infant carrier. An adjustable band spanning between and connecting the two rods allows the user to lift and change the position of the present invention before or during use. In this way, the base of the cart is freed for the addition of items.

DETAILED DESCRIPTION OF THE INVENTION

All illustrations of the drawings are for the purpose of describing selected versions of the present invention and are not intended to limit the scope of the present invention.

Figure 1:
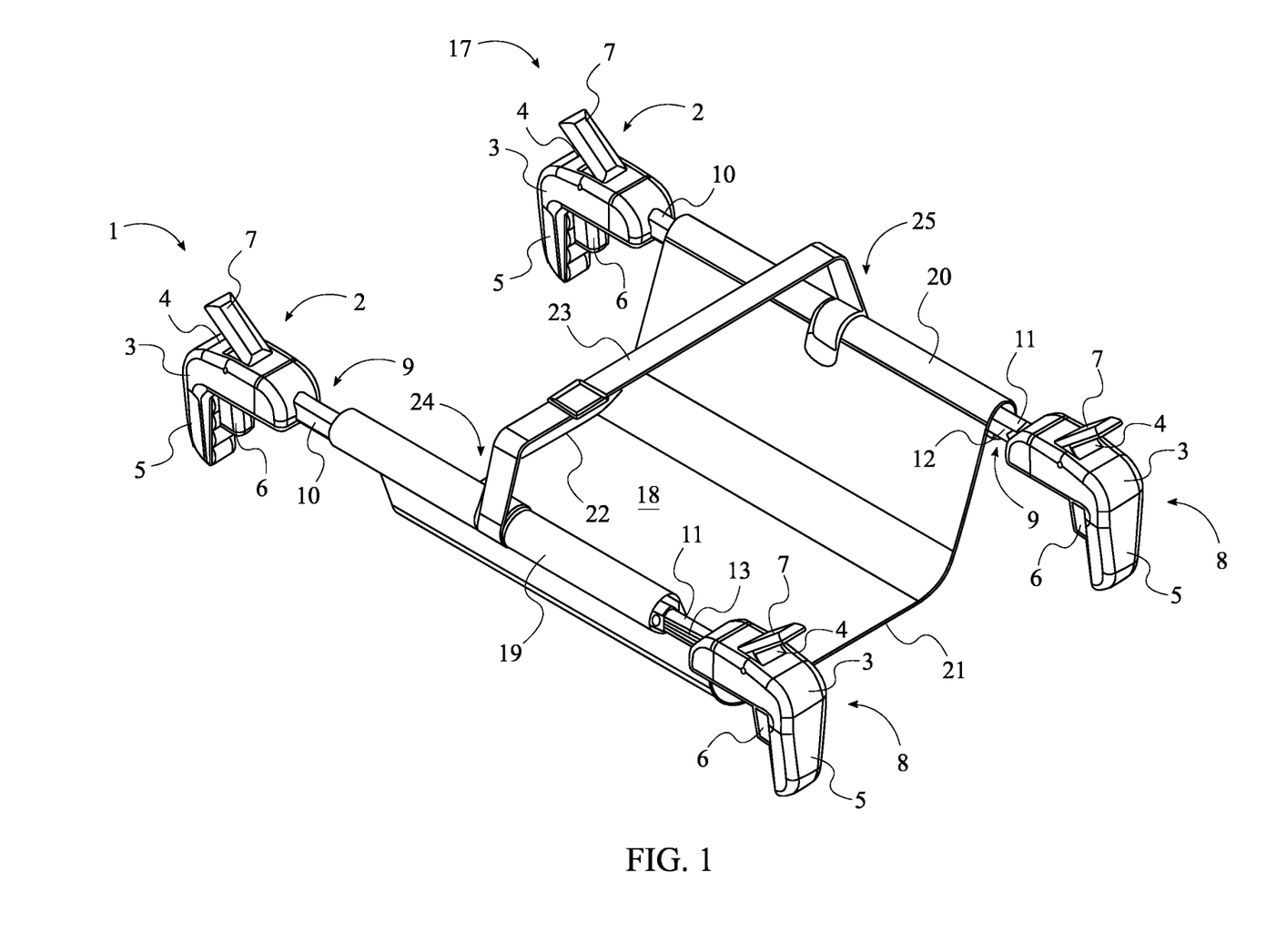
FIG. 1 is a front-left perspective view of the present invention with levers.

The present invention is a car seat holder that is used to support a portable infant car seat. The present invention is also configured to adapt to a shopping cart, thereby increasing shopping cart volume available for groceries and goods while shopping. The present invention comprises a first support 1, a second support 17, and a canvas 18, as shown in FIG. 1. The first support 1 and the second support 17 are elongated members that extend across a shopping cart in the preferred usage of the present invention. The first support 1 and the second support 17 are rigid members that distribute the weight of an infant carriage device. The canvas 18 is a flexible surface that extends from the first support 1 to the second support 17 across the shopping cart. The canvas 18 provides a mechanism for transmitting the weight of the infant carriage device to the first support 1 and the second support 17.

Figure 2:
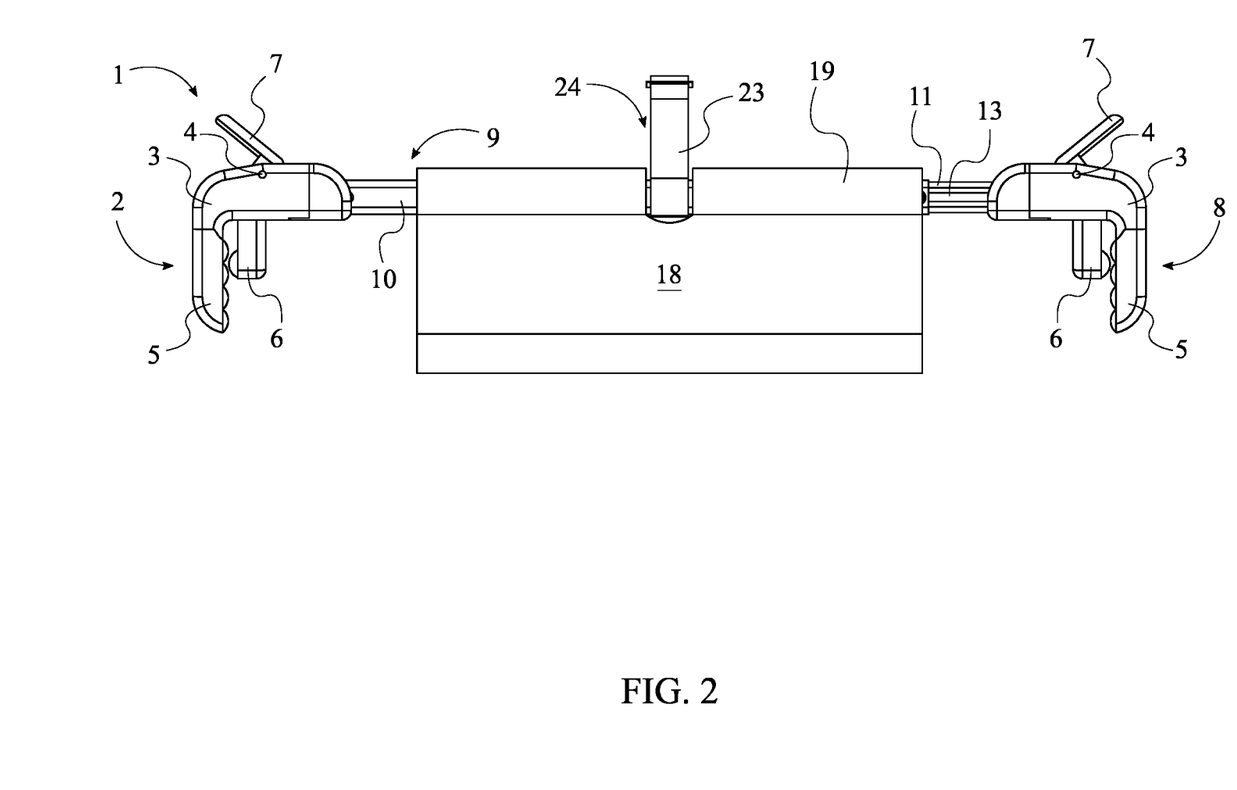
FIG. 2 is a left view of the present invention with levers.

The general configuration of the aforementioned components allows the present invention to efficiently and effectively contain and lift a portable infant car seat. The first support 1 and the second support 17 may each comprise a left clip 2, a right clip 8, and a length-adjustable member 9, as shown in FIG. 2. The left clip 2 is the rigid connector that joins the first support 1 and the second support 17 to a shopping cart. The right clip 8 is a similar rigid connector that joins the first support 1 and the second support 17 to a shopping cart, opposite the left clip 2. In this way, the left clip 2 and the right clip 8 allow for transmission of gravitational forces from the first support 1 and the second support 17 onto the framework of the shopping cart. The length-adjustable member 9 is a set of concentric tubes or hollow supports that telescope within each other to allow the present invention to change size. This arrangement enables smooth modification of the length of the first support 1 and the second support 17 in order to match the spanning distance of the shopping cart. The left clip 2 and the right clip 8 each may comprise a clip body 3, a recoiling mechanism 4, a first tong 5, a second tong 6, and a clip actuator 7. The clip body 3 represents the physical volume occupied by the left clip 2 and the right clip 8. The recoiling mechanism 4 denotes a spring or other such device capable of storing and releasing mechanical energy upon the first tong 5 or the second tong 6. The first tong 5 is a rigid extension that generally remains in contact with a shopping cart during the preferred usage of the present invention in order to provide a surface against which the second tong 6 may press. The second tong 6 is a rigid extension that shifts relative to a shopping cart during the preferred usage of the present invention in order to shift either towards the first tong 5 to secure the present invention in place or away from the first tong 5 to release the present invention. The clip actuator 7 is a mechanism which toggles the closed or open configuration of the left clip 2 and the right clip 8. Furthermore, the canvas 18 must be appropriately oriented in order to provide ample space for a portable infant car seat. To this end, the canvas 18 may comprise a first edge 19 and a second edge 20. The first edge 19 denotes the end of the canvas 18 along a direction. The second edge 20 denotes the end of the canvas 18 along a direction opposite the first edge 19.

The left clip 2 and the right clip 8 must both be capable of arranging a corresponding length-adjustable member 9 in place, thus providing a support for the canvas 18. To achieve this, the left clip 2 may be terminally connected to the length-adjustable member 9, as shown in FIG. 1. This arrangement allows the left clip 2 to support the length-adjustable member 9 atop a shopping cart. Similarly, the right clip 8 may be terminally connected to the length-adjustable member 9, opposite the first clip. Thus, the right clip 8 works in conjunction with the left clip 2 to position the length-adjustable member 9 appropriately over a shopping cart. The first edge 19 and the second edge 20 may be positioned opposite to each other across the canvas 18. The first edge 19 and the second edge 20 are therefore arranged optimally for connection to the first support 1 and the second support 17. The first edge 19 may be slidably connected along the length-adjustable member 9 of the first support 1. This arrangement allows the first edge 19 to move along the length-adjustable member 9, thus providing the canvas 18 with the ability to adjust due to the weight of held items. Similarly, the second edge 20 may be slidably connected along the length-adjustable member 9 of the second support 17. This arrangement allows the second edge 20 to move along the length-adjustable member 9, thus providing the canvas 18 with the ability to adjust due to the weight of held items.

Both the left clip 2 and the right clip 8 of both the first support 1 and the second support 17 must be capable of connecting or mounting to a shopping cart during use. To this end, the first tong 5 and the second tong 6 may be positioned adjacent to each other along the clip body 3, as shown in FIG. 2. This arrangement enables the first tong 5 and the second tong 6 to engage with each other during connection to a shopping cart. The first tong 5 may be laterally connected to the clip body 3. The first tong 5 therefore serves as the structure against which the second tong 6 may interact. The second tong 6 may be movably mounted to the clip body 3. Thus, the second tong 6 may pivot, slide, or otherwise shift translationally or rotationally in order to enable connection of the first clip and the second clip to a shopping cart. The clip actuator 7 may be positioned opposite to the first tong 5 and the second tong 6 about the clip body 3. This arrangement positions the clip actuator 7 appropriately to toggle the clip body 3 between open and closed configurations. The clip actuator 7 is operatively coupled to the second tong 6, wherein the clip actuator 7 is used to separate the second tong 6 from the first tong 5. Thus, the clip actuator 7 enables selective manipulation of the second tong 6 relative to the first tong 5. The recoiling mechanism 4 may be mounted with the clip body 3. In this way, the recoiling mechanism 4 is positioned to allow for the application of a positional bias upon the second tong 6. The recoiling mechanism 4 may be operatively coupled to the second tong 6, wherein the recoiling mechanism 4 is used to recoil the second tong 6 towards the first tong 5. In this way, the clip body 3 is biased into a closed arrangement, thereby reducing the likelihood of the present invention accidentally releasing from a shopping cart during use.

Figure 4:
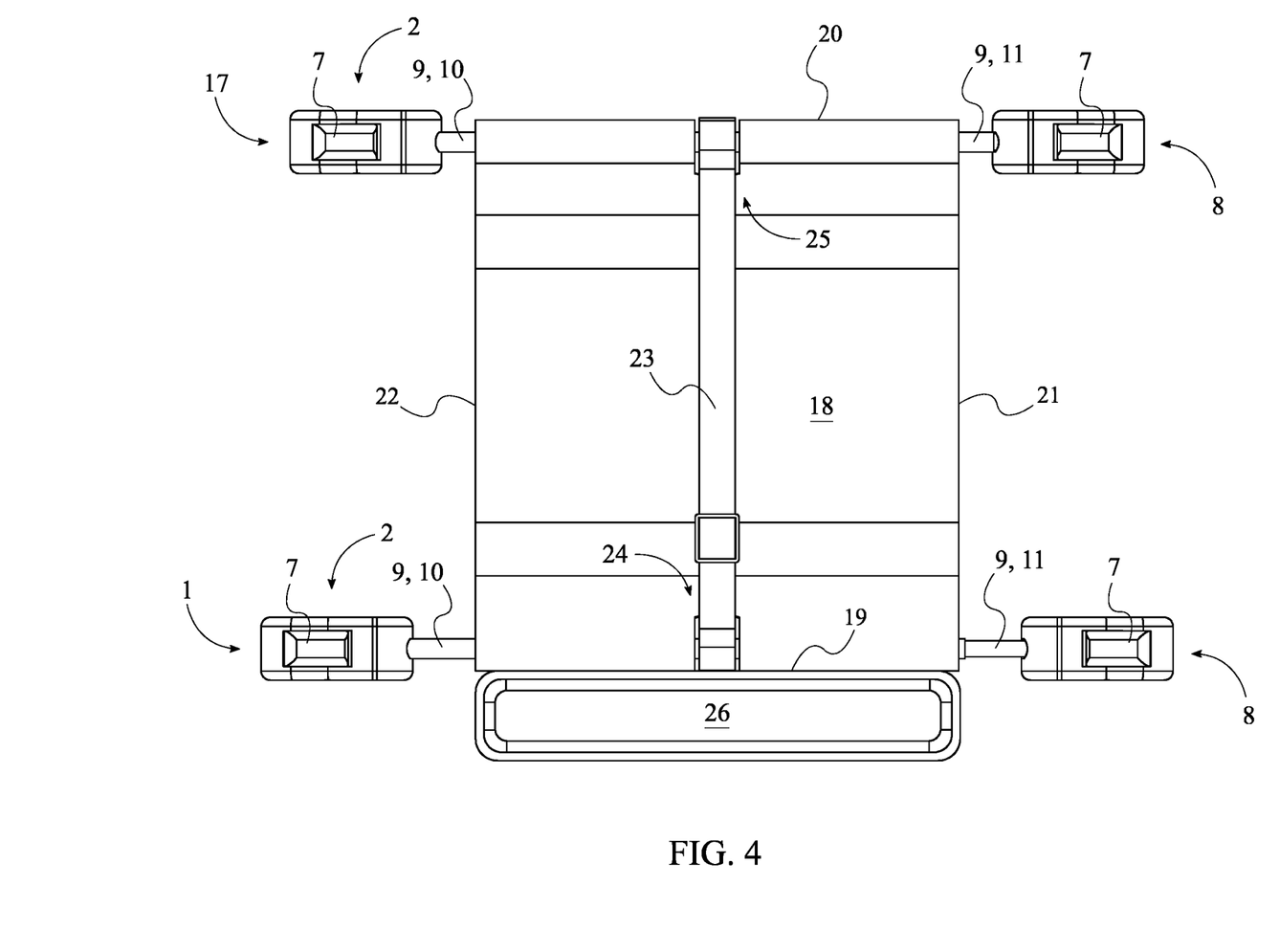
FIG. 4 is a top view of the present invention with levers.

While the clip actuator 7 may take any form that enables actuation of the second tong 6, the clip actuator 7 is preferably intuitive in shape, thereby facilitating use. To this end, the clip actuator 7 may be a lever, as shown in FIGS. 2 and 4. This arrangement provides a convenient and accessible mechanism for desirably modifying the position of the second tong 6. The first tong 5 may be terminally positioned to the length-adjustable member 9. In this way, the first tong 5 is, in an exemplary usage of the present invention, on the outside of the edge of a shopping cart. The second tong 6 may be positioned offset from the first tong 5 along the length-adjustable member 9. Thus, the second tong 6 may, in an exemplary usage of the present invention, shift towards or away from the inside of the edge of a shopping cart. Finally, the second tong 6 may be slidably mounted along the clip body 3. This arrangement enables a user to operate the lever in order to slide the second tong 6 closer to or further from the first tong 5.

Figure 5:
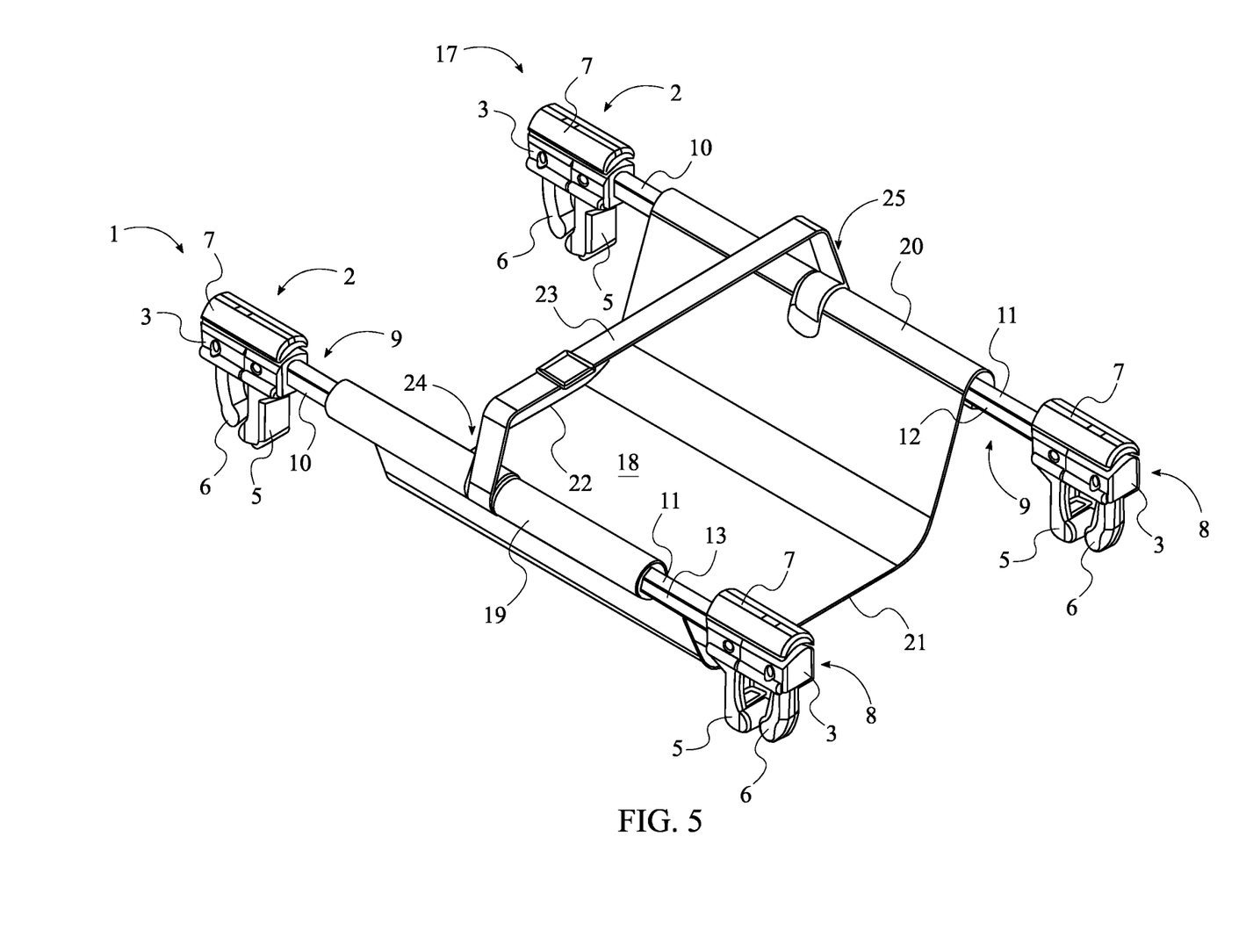
FIG. 5 is a front-left perspective view of the present invention with buttons.
Figure 6:
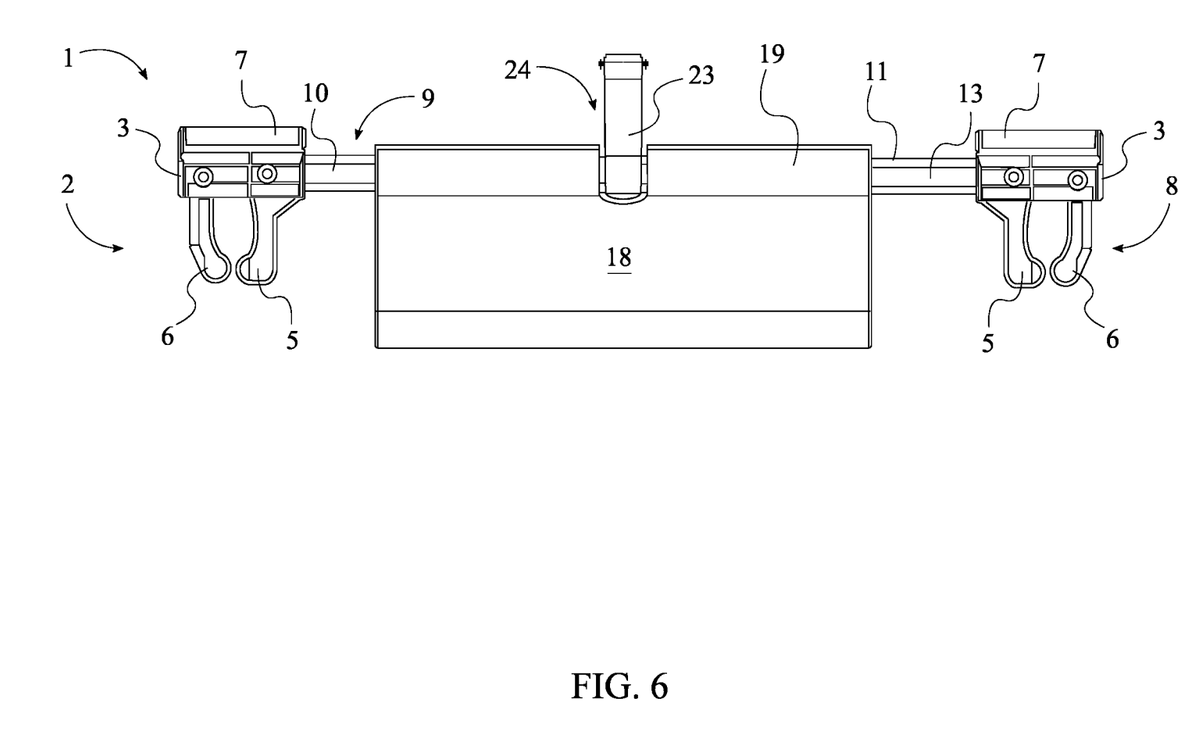
FIG. 6 is a left view of the present invention with buttons.

Similarly, the clip actuator 7 may benefit from employing a push-style actuator to toggle the open/closed status of the clip body 3. To this end, the clip actuator 7 may be a press button, as shown in FIGS. 5 and 6. The press button is an actuator that toggles the status of the clip body 3 through depression of a rigid member. The second tong 6 may be terminally positioned to the length-adjustable member 9. This arrangement places the second tong 6, in an exemplary usage of the present invention, outside of the edge of a shopping cart. The first tong 5 may be positioned offset from the second tong 6 along the length-adjustable member 9. In this way, the first tong 5 is, in an exemplary usage of the present invention, on the inside of the edge of a shopping cart. The second tong 6 may be hingedly connected to the clip body 3. Therefore, the second tong 6 may rotate into or away from the first tong 5.

Figure 3:
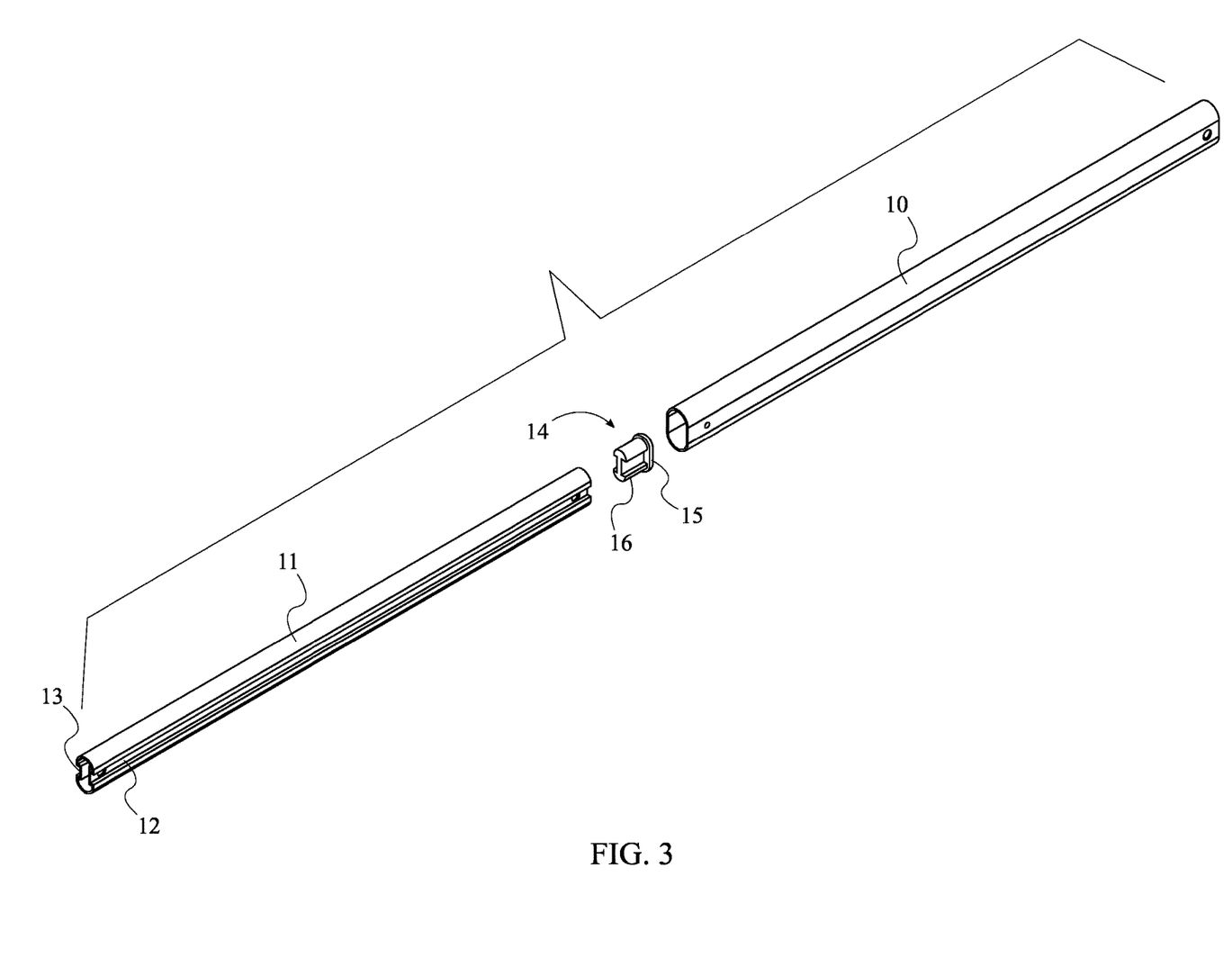
FIG. 3 is an exploded view of a length-adjustable member of the present invention.

In order to operate properly, the present invention requires the length-adjustable member 9 to be able to expand and contract as needed. To this end, the length-adjustable member 9 may comprise a first tubular body 10 and a second tubular body 11, as shown in FIG. 3. The first tubular body 10 is a hollow, generally cylindrical member that allows for the present invention to fit upon a shopping cart. Similarly, the second tubular body 11 is a hollow, generally cylindrical member that allows for the present invention to fit upon a shopping cart. In this way, the first tubular body 10 and the second tubular body 11 are positioned to be appropriately connected to each other. The first tubular body 10 and the second tubular body 11 may be telescopically engaged to each other. This allows for modification and control over the length of the length-adjustable member 9.

The first tubular body 10 and the second tubular body 11 must be capable of sliding in position relative to each other in order to ensure that the present invention may fit shopping carts of various sizes. To this end, a transversal cross section for the first tubular body 10 may be a first oblong shape, as shown in FIG. 3. The unequal major and minor axis lengths of the first oblong shape enable the first oblong shape to retain the second tubular body 11 without incidental rotation during use. Similarly, a transversal cross section for the second tubular body 11 may be a second oblong shape. In this way, the first oblong shape and the second oblong shape may fit appropriately within each other. Finally, a circumference of the first oblong shape may be greater than a circumference of the second oblong shape. The circumference of the first oblong shape and the circumference of the second oblong shape represent the perimeters of the first oblong shape and the second oblong shape, respectively. This arrangement allows the second tubular body 11 to fit snugly within the first oblong shape.

In order to further facilitate sliding of the second tubular body 11 within the first tubular body 10, the second tubular body 11 may contain various cuts or channels that reduce friction between the second tubular body 11 and the first tubular body 10. To this end, the second oblong shape may comprise a first indent 12 and a second indent 13, as shown in FIG. 3. The first indent 12 is a cut or channel that runs along the length of the second tubular body 11. Similarly, the second indent 13 is a cut or channel that runs along the length of the second tubular body 11. The first indent 12 and the second indent 13 may be positioned opposite to each other about the second oblong shape. In this way, friction due to contact between the inside of the first tubular body 10 and the second tubular body 11 may be minimized, thus facilitating sliding of the second tubular body 11 within the first tubular body 10.

Furthermore, it may be advantageous to prevent undesirable or excessive sliding of the second tubular body 11 through the first tubular body 10. To this end, the length-adjustable member 9 may further comprise a retention cap 14, as shown in FIG. 3. The retention cap 14 is a fixture that further adjusts the sliding motion of the second tubular insert within the first tubular insert. The retention cap 14 may comprise a cap flange 15 and a cap insert 16. The cap flange 15 is a wide section of the retention cap 14 that preferably interacts with the first tubular insert. The cap insert 16 is a rigid segment of the retention cap 14 that extends generally into the second tubular insert, up to the cap flange 15. The cap flange 15 may be terminally connected to the cap insert 16. This arrangement results in optimal positioning of the retention cap 14 within the second tubular body 11. The cap flange 15 may be laterally pressed against by the first tubular body 10. Thus, sliding forces between the first tubular body 10 and the second tubular body 11 may translate through the cap flange 15. Finally, the cap insert 16 may be terminally mounted into the second tubular body 11. In this way, the retention cap 14 further facilitates motion of the second tubular body 11 relative to the first tubular body 10.

The present invention benefits from features that improve portability. To this end, the present invention may further comprise a length-adjustable strap 23, as shown in FIG. 1. The length-adjustable strap 23 is a flexible fabric unit that allows for movement of the present invention between locations or orientations. The length-adjustable strap 23 may comprise a first strap end 24 and a second strap end 25. The first strap end 24 and the second strap end 25 are opposing segments of the length-adjustable strap 23 that are preferably utilized in connection of the length-adjustable strap 23 to the present invention. The first strap end 24 is rotatably connected to the length-adjustable member 9 of the first support 1. This allows the first strap end 24 to adjust and pivot in position relative to the first support 1 without causing the length-adjustable strap 23 to wind or twist undesirably. The second strap end 25 is rotatably connected to the length-adjustable member 9 of the second support 17. This allows the second strap end 25 to adjust and pivot in position relative to the second support 17 without causing the length-adjustable strap 23 to wind or twist undesirably.

In an exemplary embodiment, the user may wish to carry or transport items other than an infant car seat in the present invention. To address this need, in an alternative embodiment, the present invention may further comprise a basket 26, as shown in FIG. 4. The basket 26 is a receptacle that allows for containment of items near the canvas 18. The basket 26 may be mounted along the first support 1. In this way, the basket 26 position will not shift during usage. Further, the basket 26 is positioned opposite to the canvas 18 about the first support 1. This positioning and orientation ensure that the basket 26 is arranged optimally for item storage.

Optimal cart width usage is required to guarantee secure containment of a portable car seat. To this end, the canvas 18 may further comprise a third edge 21 and a fourth edge 22, as shown in FIG. 1. The third edge 21 is a segment of the canvas 18 between the first edge 19 and the second edge 20 which, during the preferred usage of the present invention, generally denotes the left side of the canvas 18. The fourth edge 22 is a segment of the canvas 18 between the first edge 19 and the second edge 20 which, during the preferred usage of the present invention, generally denotes the right side of the canvas 18. The third edge 21 and the fourth edge 22 may be positioned opposite to each other across the canvas 18. This arrangement establishes the dimensionality of the canvas 18 between the third edge 21 and the fourth edge 22. The third edge 21 and the fourth edge 22 may be positioned in between the first edge 19 and the second edge 20. This ensures that the third edge 21 and the fourth edge 22 are arranged along the sides of a shopping cart. The third edge 21 is positioned adjacent to the left clip 2 of the first support 1 and the left clip 2 of the second support 17. Similarly, the fourth edge 22 is positioned adjacent to the right clip 8 of the first support 1 and the right clip 8 of the second support 17. In this way, the canvas 18 is optimally sized to completely span the width of a shopping cart.

Although the invention has been explained in relation to its preferred embodiment, it is to be understood that many other possible modifications and variations can be made without departing from the spirit and scope of the invention as hereinafter claimed.

What is claimed is:

1. A car seat holder comprises:
   a first support;
   a second support;
   a canvas;
   the first support and the second support each comprise a left clip, a right clip, and a length-adjustable member;
   the left clip and the right clip each comprise a clip body, a recoiling mechanism, a first tong, a second tong, and a clip actuator;
   the canvas comprises a first edge and a second edge;
   the left clip being terminally connected to the length-adjustable member;
   the right clip being terminally connected to the length-adjustable member, opposite the left clip;
   the first edge and the second edge being positioned opposite to each other across the canvas;
   the first edge being slidably connected along the length-adjustable member of the first support;
   the second edge being slidably connected along the length-adjustable member of the second support;
   the first tong and the second tong being positioned adjacent to each other along the clip body;
   the first tong being laterally connected to the clip body;
   the second tong being movably mounted to the clip body;
   the clip actuator being positioned opposite to the first tong and the second tong about the clip body;
   the clip actuator being operatively coupled to the second tong, wherein the clip actuator is used to separate the second tong from the first tong;
   the recoiling mechanism being mounted with the clip body; and
   the recoiling mechanism being operatively coupled to the second tong, wherein the recoiling mechanism is used to recoil the second tong towards the first tong.

2. The car seat holder as claimed in claim 1 comprises:
   the clip actuator being a lever;
   the first tong being terminally positioned to the length-adjustable member;
   the second tong being positioned offset from the first tong along the length-adjustable member; and
   the second tong being slidably mounted along the clip body.

3. The car seat holder as claimed in claim 1 comprises:
   the clip actuator being a press button;
   the second tong being terminally positioned to the length-adjustable member;
   the first tong being positioned offset from the second tong along the length-adjustable member; and
   the second tong being hingedly connected to the clip body.

4. The car seat holder as claimed in claim 1 comprises:
the length-adjustable member comprises a first tubular body and a second tubular body; and
the first tubular body and the second tubular body being telescopically engaged to each other.

5. The car seat holder as claimed in claim 4 comprises:
a transversal cross section for the first tubular body being a first oblong shape;
a transversal cross section for the second tubular body being a second oblong shape; and
a circumference of the first oblong shape being greater than a circumference of the second oblong shape.

6. The car seat holder as claimed in claim 5 comprises:
the second oblong shape comprises a first indent and a second indent; and
the first indent and the second indent being positioned opposite to each other about the second oblong shape.

7. The car seat holder as claimed in claim 4 comprises:
the length-adjustable member further comprises a retention cap;
the retention cap comprises a cap flange and a cap insert;
the cap flange being terminally connected to the cap insert;
the cap flange being laterally pressed against by the first tubular body; and
the cap insert being terminally mounted into the second tubular body.

8. The car seat holder as claimed in claim 1 comprises:
a length-adjustable strap;
the length-adjustable strap comprises a first strap end and a second strap end;
the first strap end being rotatably connected to the length-adjustable member of the first support; and
the second strap end being rotatably connected to the length-adjustable member of the second support.

9. The car seat holder as claimed in claim 1 comprises:
a basket;
the basket being mounted along the first support; and
the basket being positioned opposite to the canvas about the first support.

10. The car seat holder as claimed in claim 1 comprises:
the canvas comprises a third edge and a fourth edge;
the third edge and the fourth edge being positioned opposite to each other across the canvas;
the third edge and the fourth edge being positioned in between the first edge and the second edge;
the third edge being positioned adjacent to the left clip of the first support and the left clip of the second support; and
the fourth edge being positioned adjacent to the right clip of the first support and the right clip of the second support.

11. A car seat holder comprises:
a first support;
a second support;
a canvas;
a length-adjustable strap;
the first support and the second support each comprise a left clip, a right clip, and a length-adjustable member;
the left clip and the right clip each comprise a clip body, a recoiling mechanism, a first tong, a second tong, and a clip actuator;
the canvas comprises a first edge and a second edge;
the length-adjustable strap comprises a first strap end and a second strap end;
the left clip being terminally connected to the length-adjustable member;
the right clip being terminally connected to the length-adjustable member, opposite the left clip;
the first edge and the second edge being positioned opposite to each other across the canvas;
the first edge being slidably connected along the length-adjustable member of the first support;
the second edge being slidably connected along the length-adjustable member of the second support;
the first tong and the second tong being positioned adjacent to each other along the clip body;
the first tong being laterally connected to the clip body;
the second tong being movably mounted to the clip body;
the clip actuator being positioned opposite to the first tong and the second tong about the clip body;
the clip actuator being operatively coupled to the second tong, wherein the clip actuator is used to separate the second tong from the first tong;
the recoiling mechanism being mounted with the clip body;
the recoiling mechanism being operatively coupled to the second tong, wherein the recoiling mechanism is used to recoil the second tong towards the first tong;
the first strap end being rotatably connected to the length-adjustable member of the first support; and
the second strap end being rotatably connected to the length-adjustable member of the second support.

12. The car seat holder as claimed in claim 11 comprises:
the clip actuator being a lever;
the first tong being terminally positioned to the length-adjustable member;
the second tong being positioned offset from the first tong along the length-adjustable member; and
the second tong being slidably mounted along the clip body.

13. The car seat holder as claimed in claim 11 comprises:
the clip actuator being a press button;
the second tong being terminally positioned to the length-adjustable member;
the first tong being positioned offset from the second tong along the length-adjustable member; and
the second tong being hingedly connected to the clip body.

14. The car seat holder as claimed in claim 11 comprises:
the length-adjustable member comprises a first tubular body and a second tubular body; and
the first tubular body and the second tubular body being telescopically engaged to each other.

15. The car seat holder as claimed in claim 14 comprises:
a transversal cross section for the first tubular body being a first oblong shape;
a transversal cross section for the second tubular body being a second oblong shape; and
a circumference of the first oblong shape being greater than a circumference of the second oblong shape.

16. The car seat holder as claimed in claim 15 comprises:
the second oblong shape comprises a first indent and a second indent; and
the first indent and the second indent being positioned opposite to each other about the second oblong shape.

17. The car seat holder as claimed in claim 14 comprises:
the length-adjustable member further comprises a retention cap;
the retention cap comprises a cap flange and a cap insert;
the cap flange being terminally connected to the cap insert;
the cap flange being laterally pressed against by the first tubular body; and the cap insert being terminally mounted into the second tubular body.

18. The car seat holder as claimed in claim 11 comprises:

a basket;

the basket being mounted along the first support; and the basket being positioned opposite to the canvas about the first support.

19. The car seat holder as claimed in claim 11 comprises:

the canvas comprises a third edge and a fourth edge;

the third edge and the fourth edge being positioned opposite to each other across the canvas;

the third edge and the fourth edge being positioned in between the first edge and the second edge;

the third edge being positioned adjacent to the left clip of the first support and the left clip of the second support; and the fourth edge being positioned adjacent to the right clip of the first support and the right clip of the second support.

* * * * *